United States Patent Office 2,837,587
Patented June 3, 1958

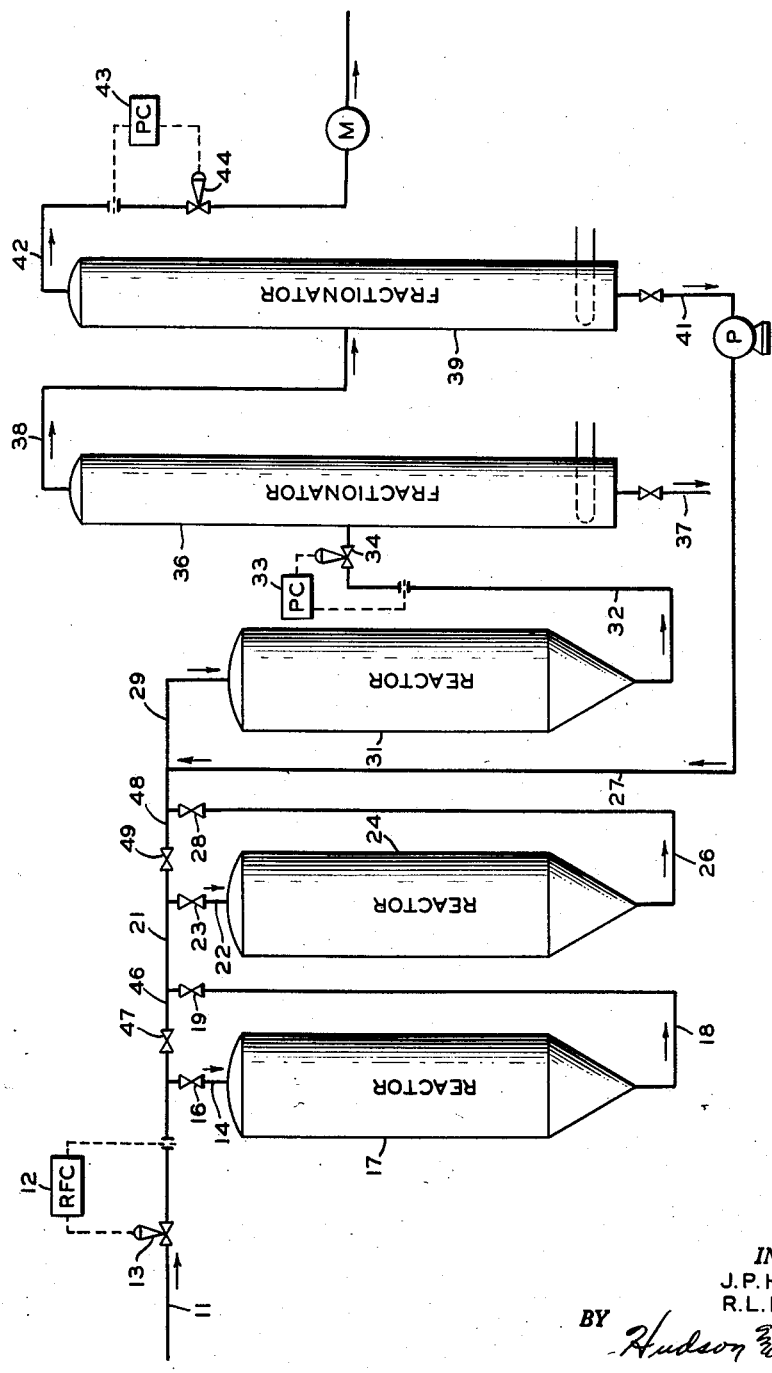

2,837,587
PURIFICATION OF OLEFIN-RICH FEED PRIOR TO POLYMERIZATION

John Paul Hogan and Robert L. Banks, Bartlesville, Okla., assignors to Phillips Petroleum Company, a corporation of Delaware Application August 20, 1954, Serial No. 451,311

28 Claims. (Cl. 260—683.15)

This invention pertains to the purification of olefin-rich streams, such as ethylene and/or propylene-rich feed streams, containing impurities which poison solid catalysts used in polymerizing the olefins in such streams.

This is a continuation-in-part application of our application S. N. 275,824, filed March 10, 1952, now abandoned.

The polymerization of ethylene and/or propylene over a nickel oxide catalyst activated by heating the catalyst in an oxidizing or non-reducing ambient at a temperature in the range of 700 to 1300° F. is disclosed and claimed in U. S. Patent 2,381,198, issued August 7, 1945, to Grant C. Bailey et al. and in application Serial No. 599,536, filed June 15, 1945, by the same inventors, now Patent No. 2,606,940. The nickel oxide-silica-alumina catalyst which is the most effective catalyst-carrier composite in polymerizing ethylene and propylene feeds is disclosed and claimed in application Serial No. 718,036, filed December 23, 1946, by Grant C. Bailey et al., now Patent No. 2,581,228. The nickel oxide catalyst disclosed therein is active in polymerizing ethylene and propylene when the catalyst is dispersed on such supports as kieselguhr, silica, and particularly so when distended on silica-alumina gel in which the alumina amounts to preferably from 1 to 10 weight percent of the composite even though greater amounts of alumina up to 75 or 80 percent do not greatly detract from the efficiency of the carrier.

The polymerization of certain 1-olefins in contact with chromium oxide deposited on silica and/or alumina produces unique polymers ranging from tacky to solid in nature. This process is disclosed in the copending application of J. P. Hogan and R. L. Banks, S. N. 476,306, filed December 20, 1954.

Other metal-containing catalysts utilized in polymerizing olefins include the oxides, sulfides, and sulfates of vanadium, molybdenum, uranium, manganese, titanium, zirconium, aluminum, etc., alone, in combination, and deposited on suitable porous supports.

The above described metal-containing solid catalysts are susceptible to poisoning by certain impurities in commercially available feeds whereby their activity is at least greatly reduced and oftentimes completely destroyed.

To illustrate the invention, nickel oxide will be treated as representative of metal-containing solid catalysts. While the above-described nickel oxide catalyst deposited on silica-alumina effects conversion of ethylene of upwards of 90 percent and even as high as 99 percent when using a pure ethylene feed, it has been found that when polymerizing ethylene and/or propylene-rich refinery streams the catalyst is rapidly deactivated by certain poisons contained in those streams as impurities. The poisoning of the catalyst is so rapid that it becomes completely deactivated so that it effects no conversion of ethylene or propylene in as short a time as one hour or less, and in almost every instance, a period of three hours or less. These poisons are also deleterious to other metal-containing polymerization catalysts.

One of the chief sources of ethylene and propylene in the petroleum industry is from the cracking of normally gaseous paraffin hydrocarbons, particularly propane and n-butane, in tube crackers or in pebble heaters.

A typical composition of ethylene and propylene-rich streams from this source is set forth in Table I.

TABLE I

| Stream | Composition of commercial ethylene-rich streams | | | |
|---|---|---|---|---|
| | A | B | C | D |
| Hydrogen | 8.5 | 9.4 | 12.0 | 9.3 |
| Nitrogen | 0.1 | 0.1 | 0.2 | 0.1 |
| Carbon monoxide | 0.10 | 0.04 | 0.02 | 0.01 |
| Methane | 40.4 | 40.3 | 38.5 | 40.8 |
| Acetylene | 0.10 | 0.16 | 0.4 | 0.1 |
| Ethylene | 26.1 | 26.5 | 20.8 | 27.8 |
| Ethane | 9.5 | 9.0 | 17.0 | 7.8 |
| Propylene | 11.9 | 12.8 | 6.3 | 10.6 |
| Propane | 0.9 | 0.7 | 3.0 | 0.9 |
| Butadiene | 0.3 | 0.2 | 0.2 | 0.4 |
| Butenes | 0.5 | 0.8 | 0.1 | 0.5 |
| Butane | 1.7 | | 1.5 | 1.8 |

Streams A, B, and D are the effluents taken at different times from a tube cracker cracking propane and n-butane. Stream C is a combined stream made up of the effluents from a tube cracking furnace and from a pebble heater both of which were cracking propane and n-butane. Each of the feeds in Table I, when passed over a nickel oxide on silica-alumina catalyst under polymerizing conditions completely deactivates the catalyst in less than three hours.

In order to determine what constituents of commercially available ethylene and propylene-rich streams were poisons to nickel oxide catalysts in polymerizing ethylene and propylene, a study was made of the effect of some of the suspected impurities when added to a relatively pure ethylene feed. A number of gaseous feeds were prepared by adding the impurity to be studied to a 45 percent ethylene-55 percent hydrogen mixture. Table II shows the ethylene conversion effected with different feeds made by adding small proportions of the common impurities found in ethylene and propylene-rich streams for different periods on stream as compared to the conversion of the ethylene without any additive for the same periods.

TABLE II

*Catalyst poisoning studies*

[Operation at 300 p. s. i. g., 100° F., 600 hourly space velocity of 45 percent ethylene-55 per cent hydrogen feed over nickel oxide-impregnated silica-alumina catalyst.]

| Impurity added to feed | Ethylene conversion, hr. on stream | | | | |
|---|---|---|---|---|---|
| | ½ | 1 | 2 | 3 | 4 |
| None | | 98 | 76 | 42 | 28 |
| 0.7% acetylene | 55 | 0 | | | |
| 0.1% oxygen | 99 | 86 | 40 | 18 | |
| 0.2% 1,3-butadiene | 99 | 82 | 25 | | |
| None | | 94 | 64 | 31 | 14 |
| 0.2% hydrogen sulfide | 99 | 91 | 37 | 14 | |
| 0.2% ethylene oxide | 99 | 93 | 61 | 26 | 9 |
| 0.2% carbon monoxide | | 0 | | | |
| 0.05% carbon monoxide | 30 | 0 | | | |
| 0.01% carbon monoxide | 98 | 70 | 22 | 2 | |
| 0.10-0.15% water vapor | 99 | 88 | 52 | 27 | 15 |

The added impurities are expressed in mol percent.

Separate runs using no added impurity were made using ethylene from two different cylinders and the runs following each of these were made using ethylene from the same cylinder so as to render the results more accurate. The gradual deactivation of the nickel oxide catalyst in the runs using no additive impurity is due, no doubt, to traces of impurities in the relatively pure cylinder gas from which the feeds were blended and differed due to the variation in the purity of the ethylene from the two different cylinders. The source of ethylene was 99.5 percent pure Matheson ethylene.

It can be readily seen that carbon monoxide is the strongest poison tested. When present in a feed in amounts as low as 0.05 percent, the catalyst became inactive in less than one hour on stream. The gradual poisoning of the catalyst in the reference runs was probably due in part to this impurity, as qualitative tests have shown carbon monoxide to be present in the cylinder ethylene used in blending the feeds.

Acetylene was also a strong catalyst poison. When present in the feed at a concentration of 0.7 percent the catalyst was deactivated in less than one hour on stream.

Butadiene, oxygen, ad hydrogen sulfide were also catalyst poisons, although their effects are not as drastic as those of carbon monoxide and acetylene. Ethylene oxide and water vapor in concentrations of less than 0.2 percent do not have much effect on catalyst activity.

The principal object of the invention is to provide a process for the polymerization of commercial olefin-rich streams, such as ethylene and/or propylene-rich streams, in contact with metal-containing, particularly, nickel oxide catalysts, which process avoids rapid deactivation of the catalyst. Another object of the invention is to provide a process for the removal of certain poisons to metal-containing catalysts found in commercial ethylene and propylene streams. It is also an object of the invention to provide a process for the removal of carbon monoxide from commercial ethylene and propylene supplies. Another object is to provide a process for the selective hydrogenation of acetylene in the presence of substatnial amounts of hydrogen in admixture with normally gaseous olefins without substantial hydrogenation of the olefins. It is a further object of the invention to provide for the removal of such poisons as butadiene, oxygen, and hydrogen sulfide or mercaptan sulfur. An additional object of the invention is to provide a commercially practical process for the polymerization of normally gaseous olefins and particularly ethylene in contact with a nickel oxide catalyst. Other objects of the invention will become apparent from a consideration of the accompanying disclosure.

We have found that the impurities which normally are found in ethylene and propylene-rich effluents from the cracking of normally gaseous paraffin hydrocarbons, which impurities poison the nickel oxide catalyst described herein, are removed as such by contacting the feed gas to the polymerization process, first, with a reduced copper oxide catalyst and, then, with commercial hopcalite under conditions of pressure, temperature, and space velocity set forth below. Finely divided copper prepared by reducing copper oxide in a stream of hydrogen has been found to effectively reduce the acetylene, oxygen, butadiene, and hydrogen sulfide content of a commercial ethylene feed to zero or at least to such a minute trace that these impurities no longer poison the nickel oxide catalyst to any measurable extent. Table III presents data obtained in treating the various feeds of Table II with such a copper catalyst prior to its passage over the nickel oxide catalyst. The purification of the feed containing 0.2 percent carbon monoxide over hopcalite is also shown.

TABLE III

*Feed purification studies*

[Operation at 300 p. s. i. g., 100° F., 600 hourly space velocity of 45 percent ethylene-55 percent hydrogen feed over nickel-oxide-impregnated silica-alumina catalyst.]

| Impurity added to feed | Type of feed purification | Ethylene conversion, hours on stream | | | |
|---|---|---|---|---|---|
| | | 1 | 2 | 3 | 4 |
| None | Copper | 99 | 99 | 98 | 97 |
| 0.7% acetylene | do | 99 | 99 | 98 | 96 |
| 0.1% oxygen | do | 99 | 98 | 98 | |
| 0.2% 1,3-butadiene | do | 99 | 99 | 99 | |
| 0.2% hydrogen sulfide | do | 99 | 98 | 98 | |
| Do | do | 0 | | | |
| 0.2% carbon monoxide | Hopcalite | 97 | 96 | 96 | |

In the first run using no added impurity it can be seen that the copper catalyst very effectively removed or converted the trace of impurities to harmless compounds. The data in Table III clearly show that copper purified the feeds which contained acetylene, butadiene, oxygen, and hydrogen sulfide. Analyses on these respective purified feeds showed less than 0.05 butadiene and less than 0.005 percent hydrogen sulfide. The failure of reduced copper oxide to purify the feed containing 0.2 percent carbon monoxide is apparent and the removal of this impurity by hopcalite is likewise apparent. In view of the fact that commercially available ethylene and propylene streams contain both acetylene and carbon monoxide as well as other impurities dealt with in the table, it is apparent that purification of such a feed over both copper and hopcalite is essential to polymerization of the ethylene and/or propylene in such streams in order to avoid rapid deactivation of the catalyst.

It has been found essential to first purify streams of the type of those in Table I over a reduced copper oxide catalyst and then over hopcalite because of the fact that hopcalite is rapidly poisoned when contacted with the stream before removing such materials as acetylene, butadiene, and sulfur compounds. The copper catalyst removes all of the poisons to nickel oxide with the exception of CO which is then oxidized to $CO_2$ by contacting with hopcalite.

Reduced copper oxide catalyst may be utilized in the form of a finely comminuted mass of copper such as reduced copper oxide wire or it may be utilized in the form of reduced copper oxide distended on a coarse inert carrier such as pumice or alpha alumina although "activated alumina" has been found to be unsatisfactory as a carrier for the copper catalyst because it is not selective for the hydrogenation of acetylene but rather effects the hydrogenation of olefins as well. The copper oxide from which the finely divided copper is reduced should be reduced in a hydrogen-rich ambient at a temperature in the range of 600 to 1000° F., preferably between 700 and 800° F.

The purification treatment over copper is effective at a temperature in the range of 100 to 500° F. but preferably in the range of 200 to 400° F. The temperature will vary in accordance with the activity of the copper catalyst and also with the acetylene content of the feed to be purified, the higher the acetylene content, the higher the temperature required. Feed purification over copper catalyst is more effective under superatmospheric pressure such as a pressure in the range of 100 to 1000 p. s. i. g. and preferably in the range of 300 to 500 p. s. i. g. Space velocities from 100 to 2400 v./v./hr. (volume of gas STP, per volume of catalyst per hour) have been found effective in purifying ethylene-propylene feeds containing the usual impurities including up to 1 mol percent acetylene and 0.3 mol percent butadiene.

The removal of acetylene from an ethylene-rich feed stream by passing the same over a copper catalyst is also applicable to the purification of such a stream which is to be utilized in the alkylation of isobutane in the presence of aluminum chloride catalyst in the manufacture of diisopropyl. The acetylene in such a stream consumes aluminum chloride and as such is undesirable in the feed from the stand point of economics. Acetylene removal units would also find valuable applications in processes for the recovery of ethylene or propylene from waste refinery gases effected by use of cuprous salt-organic bases which is made less feasible by the presence of acetylene because of the deterioration of these reagents by acetylene and by the formation of explosive copper acetylide.

EXAMPLE I

Copper-on-pumice and copper-on-alpha alumina catalysts were prepared by the following standard procedure.

Pumice (6–10 mesh) or alpha-alumina (R–268; 6–10 mesh) was placed in a filter flask fitted with a dropping funnel containing a solution of copper nitrate. (The concentration of the copper nitrate solution was chosen so as to control the copper/support ratio.) After the flask was evacuated to 1 mm. pressure the copper nitrate solution was added rapidly. The support was completely covered by using a ratio of solution/support of 1:1 by volume. The flask was swirled intermittently for thirty minutes after which time excess solution was removed by filtration.

The pellets were placed in an evaporating dish, dried in an electric oven overnight at 200° F. and placed in a stainless pipe in a furnace. A stream of $N_2$ was passed over the catalyst as the temperature was increased to 800° F. Decomposition of copper nitrate to copper oxide was complete after four to five hours at temperatures of 800–850° F. The reactor was cooled to 550° F., and copper oxide was reduced to copper by adding hydrogen and increasing the temperature and maintaining it at 700–720° F. for four hours. The catalyst was stored in an atmosphere of hydrogen. Twenty-five to 100 ml. of this catalyst was charged to the catalyst tube.

By this procedure copper-on-pumice catalyst was made containing 15.5 weight percent copper, part of which was reduced at a temperature in the range of 700 to 750° F. and the other portion at 1000 to 1020° F. Copper-on-alpha alumina catalyst containing 4.2 weight percent copper and 0.27 weight percent copper were also made and reduced at 700 to 750° F.

Runs were made on 15.5 copper-on-pumice catalyst utilizing a feed of the approximate specification of Stream D of Table I in which the acetylene content was increased to 0.18 mol percent by the addition of pure acetylene, at a space velocity of 1600 v./v./hr., a pressure at 750 p. s. i. g. and at reaction temperature varying from 212 to 288° F. The data obtained are set forth in Table IV.

TABLE IV

*Acetylene removal over copper-on-pumice at various temperatures in an isothermal reactor*

| Hours on stream | Reaction temp., °F. | Feed composition (mol percent) | | Effluent composition (mol percent) | | $C_2H_2$ loss (percent) | Olefin loss (percent) |
|---|---|---|---|---|---|---|---|
| | | $C_2H_2$ | Olefins | $C_2H_2$ | Olefins | | |
| 37 | 212 | 0.18 | 36.8 | 0.15 | 36.8 | 16.7 | None |
| 39 | 234 | 0.18 | 36.8 | 0.11 | 36.8 | 38.9 | None |
| 41 | 255 | 0.18 | 36.8 | 0.03 | 36.8 | 83.3 | None |
| 42 | 275 | 0.18 | 36.8 | 0.002 | 36.8 | 93.3 | None |
| 43 | 288 | 0.18 | 36.8 | None | 36.8 | 100 | None |

The data in Table IV show the feasibility of the removal of 0.18 mol percent acetylene from a stream of the approximate composition of Stream D by selective hydrogenation of the acetylene without any olefin hydrogenation. The acetylene was removed predominantly by hydrogenation, giving approximately 57 percent yield of ethylene and a 13 percent yield of ethane. The remaining 30 percent of acetylene was removed by polymerization to 4 percent liquid polymer and 26 percent cuprene.

A feed containing 27.7 mol percent olefins and 0.05 mol percent acetylene and otherwise conforming generally to the feeds given in Table I was contacted with a catalyst consisting of 4.2 weight percent copper-on-alpha alumina as prepared in this example at a space velocity of 800 v./v./hr., a pressure of 400 p. s. i. g., and at varying reaction temperatures as set forth in Table V, together with the other data obtained in the run.

TABLE V

*Temperature range of selectivity for copper-on-alpha-alumina[1]*

| Hours on stream | Reaction temp., °F. | Effluent composition (mol percent) | | $C_2H_2$ loss (percent) | Olefin loss (percent) |
|---|---|---|---|---|---|
| | | $C_2H_2$ | Olefins | | |
| 3 | 199 | 0.011 | 27.7 | 78 | None |
| 3¼ | 211 | 0.005 | 27.7 | 90 | None |
| 3½ | 221 | 0.003 | 27.7 | 94 | None |
| 3¾ | 230 | 0.0002 | 27.7 | 99 | None |
| 4¼ | 243 | None | 27.7 | 100 | None |
| 9¾ | 229 | 0.0003 | 27.7 | 94 | None |
| 15½ | 280 | None | 27.7 | 100 | None |
| 17 | 297 | None | 27.1 | 100 | 2.2 |
| 17¾ | 322 | None | 26.8 | 100 | 3.3 |
| 18½ | 329 | None | 26.7 | 100 | 3.6 |

[1] Feed composition: Acetylene=0.05; olefins=27.7; space velocity=v./v./hr.; pressure=400 p. s. i. g.

It is evident that the catalyst containing 4.2 percent copper distended on alpha-alumina removed acetylene completely over the temperature range of approximately 230 to 280° F. without loss of olefins.

A catalyst made in a manner similar to that of making the above catalyst but containing only 0.27 percent copper did not cause hydrogenation of olefins but was less active and lost activity more easily in contact with the same feed as utilized in the run of Table V. The minimum temperature for the 0.27 percent copper catalyst was 330° F. and no olefin loss occurred below 527° F.; however, catalytic activity was completely lost after heating the catalyst to temperatures upwards of 490° for conversion at lower temperatures which were originally effective in completely removing acetylene.

EXAMPLE II

A series of runs over a copper catalyst made by reducing copper oxide wire in a hydrogen-containing ambient at a temperature in the range of 700 to 750° F. were made using feed Stream A of Table I under the conditions given in Table VI which presents the data obtained.

TABLE VI

*Effect of copper temperature on hydrogenation*

[Operation at 500 p. s. i. g., 600 v./v./hr. of ethylene-rich gas purified over copper at 400 v./v./hr. and hopcalite at 400 v./v./hr.]

| Run No. | Type of operation | Copper temp., °F. | Mol percent $C_4H_6$ in purified feed[1] | Percent unsat. loss | Conv., hr. | | |
|---|---|---|---|---|---|---|---|
| | | | | | 2 | 4 | 6 |
| 1 | Once-through (100 F.) | 324 | 0.05 | 4.5 | 94 | 92 | 91 |
| 2 | do | 273 | 0.15 | 0.5 | 94 | 85 | --- |
| 3 | $C_4$ recycle (150 F.) | 273 | 0.15 | 0.5 | 96 | 96 | 97 |

[1] All the acetylene was removed in each case.

It is seen that when the copper was operated at 324° F. (Run No. 1), practically all of the butadiene was removed but a loss of 4.5 percent of the total unsaturates occurred. No appreciable catalyst poisoning occurred in once-through operation. When the copper temperature was reduced to 273° F. (Run No. 2), 0.15 percent butadiene remained in the purified feed, and the loss in total unsaturates was only 0.5. The catalyst became poisoned quite rapidly in this case. However, in Run No. 3, in which $C_4$ recycle operation was used in the polymerization step with the same copper temperature, there was no appreciable catalyst poisoning or loss in activity. The data in Table VI demonstrate that small amounts of butadiene can be tolerated in the purified feed where $C_4$ liquid wash of the nickel oxide catalyst is used, thereby permitting operation of the copper at a lower temperature so as to avoid hydrogenation of olefins.

Purification of the purified effluent from the copper treating step has been successful in removing carbon monoxide from ethylene and/or propylene-rich streams such as those set forth in Table I by contacting the partially purified feed with hopcalite at pressures in the range of 100 to 750 p. s. i. g., temperatures in the range of 50 to 200° F., and at space velocities in the range of 100 to 1000 v./v./hr., so as to completely remove the carbon monoxide found in these feeds and in the same feeds containing added carbon monoxide. The hopcalite used in feed purification for the removal of carbon monoxide was principally a mixture of $MnO_2$, CuO, $MnCO_3$, and $CuCO_3$ which when analyzed for copper and manganese give the following results.

TABLE VII

*Composition of hopcalite, wt. percent*

As oxides:
  $MnO_2$ ---------------------------------- 70.1
  CuO ------------------------------------ 16.0

Total --------------------------------- 86.1

As carbonates:
  $MnCO_3$ --------------------------------- 92.7
  $CuCO_3$ --------------------------------- 24.8

117.5

These analytical data indicate an oxide:carbonate ratio of about 1:1. Before use, the hopcalite was dried for two hours at about 400 F. in a stream of nitrogen. The term "hopcalite" is a commercial name applied to mixtures of manganese and copper oxides which may include the carbonates of these metals. The composition consists essentially of manganese and copper oxides and carbonates but may also contain silver oxide and cobalt oxide. Periodically the hopcalite is regenerated by heating in an oxygen-containing ambient at 300–400° F. until oxidation is complete.

A survey of eleven materials other than hopcalite as agents for carbon monoxide removal was made. The materials tested for carbon monoxide removal included the following materials:

(1) *Manganese oxide-copper oxide on pumice (decomposed nitrates)*.—A quantity of 6/10 mesh pumice was dipped in an aqueous solution of the metal nitrates. After about 30 minutes of contact the excess liquid was removed and the catalyst was dried in an oven at about 225 F. The nitrates were then decomposed in a stream of nitrogen–5 percent oxygen at 850 F. Composition of the final catalyst was computed to be about 4 percent copper oxide and 4 percent manganese oxide.

(2). Catalyst No. 1 was reduced in hydrogen at 750–1000 F. for three hours.

(3) Catalyst No. 2 was re-oxidized at 520–540 F. for three hours.

(4) *Manganese oxide on pumice (decomposed nitrate)*.—Prepared by the procedure given for Catalyst No. 1 using only manganese nitrate solution for impregnation. The final catalyst contained about 8 percent manganese oxide.

(5) *Manganese oxide-copper oxide on pumice (decomposed carbonates precipitated from nitrates)*.—A quantity of 14/28 mesh pumice was impregnated with the metal nitrates in a manner similar to that described for Catalyst No. 1. After drying the catalyst, a stoichiometric amount of ammonium carbonate, in aqueous solution, was added to precipitate the carbonates. The metal carbonates were decomposed in $N_2$–5 percent $O_2$ at 750 F.

(6) *Manganese oxide-copper oxide on pumice (decomposed carbonates precipitated from sulfates)*.—Prepared in a manner similar to that described for Catalyst No. 5 except that the pumice was initially impregnated with the metal sulfates instead of the nitrates.

(7) *Aluminum chloride coke*.—Prepared by pyrolysis of the aluminum chloride-hydrocarbon complex diisopropyl catalyst. The original material was crushed and screened to 6–28 mesh. It was used without further treatment. It contained about 30 percent active aluminum chloride.

(8) *Commercial soda-lime*.—This material was used as received.

(9) *Zinc oxide*.—It was crushed and screened to 14/28 mesh.

(10) *Sublimed aluminum chloride on bauxite*.—Prepared by sublimation of anhydrous aluminum chloride onto bauxite at 350–388 F. Calculations indicated that the final catalyst contained not over 3 weight percent $AlCl_3$.

(11) *Reduced mill scale ($Fe_3O_4$)*.—Mill scale was crushed and screened to 14/28 mesh. The material was reduced by passing hydrogen over the catalyst for 39 hours at 900 F.

All of the supported oxides, except No. 6, removed some carbon monoxide but did not sufficiently purify the feed with respect to carbon monoxide removal to be suitable materials for this purpose. In addition, every one of the materials tested effected excessive olefin hydrogenation at the temperature level required for removal of appreciable quantities of carbon monoxide. Of the eleven materials tested, only iron (reduced mill scale) showed any promise in that it removed 100 percent of the CO contained in a stream of the approximate composition of Stream B of Table I in which the CO amounted to 0.02 mol per cent, but its activity in hydrogenating olefins (15 percent at 115° F.) was prohibitive.

The polymerization of ethylene and propylene in commercially available feeds, such as those of Table I, can be effected with proper feed purification in accordance with the methods of the invention so that the nickel oxide catalyst maintains its activity as measured by conversion of more than 90 percent of the olefin in the feed for long periods of time before regeneration of the catalyst is necessary. The polymerization is readily effected with nickel oxide dispersed on silica-alumina at a pressure in the range of 100 to 750 p. s. i. g., a temperature in the range of 30 to 225° F. and a space velocity in the range of 200 to 1600 v./v./hr.

*Example III*

A feed gas of the approximate composition of Stream A in Table I was purified over reduced copper oxide wire at a temperature in the range of 250 to 350° F., a space velocity of 400 v./v./hr. and polymerization reaction pressure (500 p. s. i. g.) and then over hopcalite at a temperature of 130° F., a space velocity of 400 v./v./hr. and polymerization reaction pressure and the resulting purified feed was contacted with 14 to 28 mesh silica-alumina cracking catalyst having impregnated therein 4 weight percent nickel in the form of nickel oxide activated at a temperature of 900 to 930° F. for four hours in a stream of dry nitrogen-diluted air. The polymerization conditions included a pressure of 400 p. s. i. g., a temperature in the range of 140 to 160° F., a gas feed rate of 600 v./v./hr. and a $C_4$ recycle rate of 6.5 LHSV. The feed was passed down-flow through a bed of 47 ml. of catalyst in ½-inch I. D. reactor, the bed depth being 11 inches. The recycle stream was initiated from a previous short run and was free of catalyst poisons. The mol percent composition of this stream after operation had been continued long enough for the composition to remain essentially constant was as follows: $C_2$'s, 0.2; $C_3H_6$, 0.4; $C_3H_8$, 1.2; $C_4H_8$, 11.6; $C_4H_{10}$, 86.3; $C_5+$, 0.3.

The pressure maintained in the polymerization zone was dropped to 200 p. s. i. g. for two additional runs, one using $C_4$ recycle and the other using $C_5$ recycle. The data from the three runs are shown in Table VIII.

TABLE VIII

*Variation of pressure and recycle composition*

[Operation at 140-160 F., 600 v./v./hr. of purified feed of composition A, recycle rate of 6.5 LHSV.]

| Run No. | P. sig. | Recycle | Conversion, hours | | |
|---|---|---|---|---|---|
| | | | 2 | 4 | 6 |
| 1 | 500 | $C^4$ | 95 | 95 | 96 |
| 2 | 200 | $C^4$ | 91 | 93 | 92 |
| 3 | 200 | $C_4$-$C_5$ | ------ | 93 | 94 |

In Run No. 1, the olefin conversion changed only from 98 (first run) to 95.5 percent in 100 hours. From observation of the location of the peak temperature in the catalyst bed, only the upper 25 percent of the catalyst was deactivated at the end of the run. The operating period between catalyst regeneration can thus be much longer than 100 hours with good feed purification.

The $C_5+$ polymer from Run No. 1 was essentially all in the gasoline boiling range. The clear Research octane rating of the polymer from such a run was 93.3. About 5.65 gallons, or 33.7 pounds, of the polymer were produced per MCF of feed gas. The productivity was 0.09 gallon of polymer per pound of catalyst per hour.

The data in Table VIII show that reducing the operating pressure in the polymerization zone from 500 to 200 p. s. i. g. results in a decrease in conversion at the end of six hours from 96 percent to 92 percent. It should be understood that the production from Run No. 3 in Table II is $C_6+$ polymer since all of the $C_4$ and $C_5$ hydrocarbons are recycled in the process. Hence, it can be seen that changing from $C_4$ to $C_4$ to $C_5$ recycle in operation at 200 p. s. i. g. did not affect the conversion appreciably.

While the liquid recycle rate used in the runs of Table VIII was 6.5 LHSV, the rate may be varied over a wide range with advantageous results. A $C_4$ to $C_5$ liquid recycle rate in the range of 1 to 8 or 10 LHSV may be used. It was established in runs other than those given in Table VI that increasing the polymerization temperature from 100° to 150° and 200° F. resulted in lowered conversion in once-through operation, apparently because of heavy polymer collecting on the catalyst. This was overcome by pumping $C_4$'s over the catalyst in simulated recycle operation so that higher conversion can be maintained at 150 to 200° F. than can be maintained at 100° F. without the recycle. The maximum operating temperature for the polymerization appears to be limited by the hydrogenation of the olefins in the feed. This reaction began at about 175° F. in runs under recycle conditions.

It is convenient and expedient to choose a $C_4$ to $C_5$ recycle rate such that the removal of exothermic heat of the reaction by vaporization is effected. In operation at a 150° F., 500 p. s. i. g., and a $C_4$ recycle rate of 4.2 RHSV (6.5 mols of $C_4$ per mol of olefin in the feed), the $C_4$ recycle stream contains about 13 percent butenes.

Regeneration of the nickel oxide on silica-alumina catalyst, such as that used in Example III, can be successfully effected by treatment of the catalyst with air or air diluted with nitrogen at 930° F. for about four hours. Repeated regeneration has been effected without appreciable loss in activity of the nickel oxide catalyst.

A number of catalysts other than reduced copper oxide, alone or deposited on pumice and on alpha-alumina, were tested for their capacity to selectively hydrogenate acetylene in the presence of olefins and a large excess of hydrogen, utilizing feeds comparable to those given in Table I. NiS-on-alumina, Catalyst E, was prepared by impregnating 14 to 30 mesh "activated alumina" (F-10 Alcoa) with a 70 percent solution of nickel nitrate, drying, roasting in a nitrogen-oxygen atmosphere at 750 F., and treating with an $H_2S$-containing gas until the odor of $H_2S$ was noticeable in the effluent. (This preparation is that described for the preparation of NiS hydrogenation catalyst in Ind. Eng. Chem. 40, 2297 (1948).) The catalyst was charged to the catalyst chamber, and ethylene was passed over it for ½ hour at 240° F. and atmospheric pressure. The feed was then switched to a feed of the general composition of Stream C of Table I containing 27.3 percent olefin and the following data were recorded.

10:30 A.M.—About 390° F., atmospheric pressure. $H_2S$ still present in effluent. Olefin in effluent 27.3% by Orsat.

1:55 P.M.—410–420° F. Pressured up to 500 p. s. i. g. 400 SV.

3:30 P.M.—450° F. at top of bed; 410° F. at bottom. Strong odor of sulfur in effluent not entirely removed by caustic, indicating some mercaptan sulfur. Olefin content of effluent, 19.8%.

The reduction in olefin content from 27.3 percent in the feed to 19.8 percent in the effluent represents essentially complete consumption of the hydrogen present in the feed.

A catalyst consisting of 10 percent copper-oxide-on-"activated alumina" was reduced with hydrogen at 600° F. for two hours at which time the reduction was essentially complete. This catalyst effected almost complete hydrogenation of ethylene in a feed consisting of 45 percent ethylene and 55 mol percent hydrogen at a 97° F., 300 p. s. i. g., and 200 v./v./hr.

A reduced copper oxide, 43 percent, on chromium oxide, 57 percent, was contacted with a feed comparable to Stream C of Table I at a temperature of 212° F., a pressure of 500 p. s. i. g., and a space velocity of 400 v./v./hr. The temperature was gradually increased and no hydrogenation occurred as shown by Orsat analysis of the effluent until the temperature reached approximately 240° F., at which point hydrogenation of olefins suddenly started and did not stop even though the temperature was dropped to 212° F.

The above described runs or tests indicate that nickel-sulfide, copper on "activated alumina," and copper chromite are not sufficiently selective for the hydrogenation to have practical utility in the purification of ethylene or propylene-rich streams containing hydrogen and the usual impurities in commercially available streams.

In polymerizing ethylene, propylene, and other light olefin-rich streams containing acetylene, the conversion of olefin to polymer drops off relatively rapidly due to the poisoning effect of the acetylene. It has been found that the presence of carbon monoxide in an olefin-rich feed also has a deleterious effect on the catalyst as indicated by a decrease in the conversion to polymer.

The data presented in the following examples illustrate the effect of acetylene and carbon monoxide in an olefin-rich feed on the activity of chromium oxide-silica-alumina polymerization catalyst.

EXAMPLE IV

Two runs were made with a feed containing both acetylene and ethylene admixed with n-pentane as a solvent to maintain liquid phase and with a fixed bed catalyst containing 2.5 weight percent chromium oxide on a silica-alumina support (90% silica–10% alumina). A pressure of 600 p. s. i. g. was used. The data obtained are presented in the table below.

TABLE IX
*Mixed feeds containing acetylene with ethylene or propylene*

| Run No. | Feed—mol percent | | Temperature, °F. | Lv./v./hr. | Hours on stream | Percent conversion, $C_2H_4$ |
|---|---|---|---|---|---|---|
| | $C_2H_2$ | $C_2H_4$ | | | | |
| 1 | 0.5 | 3.8 | 194 | 2.6 | 3 | 37.7 |
| 2 | 3.7 | 4.7 | 194 | 2.7 | 3 | 2.8 |

Under comparable run conditions without the acetylene in the feed conversion was higher than 98%.

EXAMPLE V

Two runs were made with a feed containing oxygen and carbon monoxide together with ethylene using isooctane as a solvent. The catalyst was similar to that of Example IV and the operating pressure was 450 p. s. i. g. The data obtained are reported in the following table.

TABLE X
*Effect of carbon monoxide and carbon dioxide on the polymerization of ethylene*

| Run number | 1 | 2 |
|---|---|---|
| P. p. m. carbon monoxide in ethylene | 1,200 | 4,800 |
| P. p. m. oxygen in ethylene | 514 | 520 |
| Reaction temperature, max., °F | 322 | 322 |
| Liquid hourly space velocity | 5.8 | 5.9 |
| Catalyst charged, grams | 155.9 | 161.0 |
| Weight percent total chromium | 2.56 | 2.54 |
| Weight percent hexavalent chromium | 2.10 | 2.08 |
| Solvent | $IC_8$ | $IC_8$ |
| Ethylene, weight percent of total feed | 1.96 | 1.91 |
| Ethylene charged, grams | 160.0 | 124.2 |
| Conversion, average, weight percent | 91.0 | 78.5 |
| Conversion, end of 5th hour, weight percent | 92.4 | 66.8 |

Both the oxygen and carbon monoxide have the effect of lowering conversion which would normally be about 98–99% under the same conditions without the impurities in the feed. However, the increased carbon monoxide concentration from 1200 to 4800 p. p. m. with a substantially constant $O_2$ content clearly demonstrates the deleterious effect of carbon monoxide.

Treatment of an olefin-rich feed with reduced copper oxide in the presence of $H_2$ not only hydrogenates any acetylene present but also reduces the oxygen content to a concentration below that which is deleterious to the polymerization catalyst.

In order to provide a more comprehensive understanding of the invention, reference is made to the drawing which shows a diagrammatic flow of the process of the invention. An ethylene and/or propylene-rich feed stream is passed through line 11 under the control of motor valve 13, regulated by recording flow-controller 12, into reactor 17 through line 14, controlled by valve 16. Reactor 17 contains a bed of reduced copper oxide catalyst effective for the purification of the feed by removing acetylene, butadiene, and other impurities therein. The partially purified feed is passed through line 18, controlled by valve 19 to line 21, from which it passes through line 22, controlled by valve 23, into reactor 24 containing a bed of hopcalite. The hopcalite in reactor 24 serves principally to convert the CO in the feed to $CO_2$. The purified feed passes through line 26, controlled by valve 28, into line 29 which conducts the purified gas to reactor 31. Reactor 31 contains a suitable nickel oxide catalyst which is effective in polymerizing naturally gaseous olefins to $C_4^+$ polymers boiling in the gasoline range. The reaction effluent from reactor 31 is conveyed, via line 32 under the control of pressure controller 33 acting through valve 34, to fractionator 36. When $C_4$'s are to be used as the recycle stream to reactor 31, fractionator 36 is operated so as to take-off the $C_5$'s and heavier as a bottoms product through line 37, the $C_4$'s and lighter passing through line 38 into fractionator 39 for separation. The $C_4$ bottoms fraction from 39 is recycled via lines 41, 27, and 29 into reactor 31 while the $C_3$'s and lighter overhead is removed via line 42 under the controlled pressure of controller 43, operating valve 44.

When $C_4$'s to $C_5$'s are to be utilized as the recycle to reactor 31, fractionators 36 and 39 are operated in conventional manner to separate $C_6$ and heavier hydrocarbons which are taken-off through line 37, and $C_4$'s to $C_5$'s in fractionator 39 which are recycled through lines 41, 27, and 29.

When operating with feeds free from carbon monoxide but containing acetylene, butadiene and other catalyst poisons which are effectively removed by treatment with reduced copper oxide or when operating with feeds containing carbon monoxide but none of the catalyst poisons which are removed by treatment with reduced copper oxide, the system of line 46 and valve 47, line 48 and valve 49, taken in conjunction with the other system of valves and lines leading to and from the reactors provide for the flowing of the feed through either reactor 17 or reactor 24 independently of each other.

Certain modifications of the invention will become apparent to those skilled in the art and the illustrative details disclosed are not to be construed as imposing unnecessary limitations on the invention.

We claim:

1. A process for polymerizing a normally gaseous olefin in a feed containing impurities comprising minor amounts of acetylene and carbon monoxide, and at least one mol of hydrogen per mol of acetylene in contact with a nickel oxide catalyst which has been activated by heating in an oxidizing atmosphere at a temperature in the range of 700 to 1300° F., which comprises contacting said feed with a reduced copper oxide catalyst so as to remove acetylene from the feed; thereafter contacting the resulting feed with hopcalite so as to remove carbon monoxide from the feed; contacting the purified feed with said nickel oxide catalyst under polymerizing conditions; and recovering liquid polymer from the process.

2. The process of claim 1 in which the feed contains at least 15 mol percent ethylene.

3. A process for removing from a hydrocarbon feed stream comprising normally gaseous olefin certain poisons to nickel oxide catalyst comprising acetylene and carbon monoxide preparatory to passing the purified stream over said catalyst, which comprises first contacting said feed stream with a copper catalyst made by reducing copper oxide, under hydrogenating conditions which selectively hydrogenate acetylene so as to substantially free said feed of acetylene; and then contacting the effluent from the first contacting step with hopcalite under conditions which convert the CO in said effluent to $CO_2$.

4. The process of claim 3 in which the first contacting step is effected at a pressure in the range of 100 to 1000 p. s. i. g., a temperature in the range of 100 to 500° F., and a space velocity in the range of 100 to 2400 v./v./hr., and the second contacting step is effected at a pressure in the range of 100 to 750 p. s. i. g., a temperature in the range of 50 to 200° F., and a space velocity in the range of 100 to 1000 v./v./hr.

5. The process of claim 4 in which the hopcalite has been activated by calcination at a temperature in the range of 300 to 400° F.

6. A process for polymerizing a normally gaseous olefin in a feed containing impurities comprising principally acetylene and carbon monoxide, each in small amounts up to 1 mol percent of the feed and hydrogen in molar excess in relation to the acetylene present, which comprises contacting said feed at a pressure in the range of 100 to 1000 p. s. i. g., a temperature in the range of 100 to 500° F., and a space velocity in the range of 100 to 2400 v./v./hr. with a copper catalyst made by reducing copper oxide, so as to selectively hydrogenate and polymerize the acetylene in said feed and remove the same as a catalyst poison; thereafter, contacting the acetylene-free effluent from said first contacting step with hopcalite in the absence of free $O_2$ at a pressure in the range of 100 to 750 p. s. i. g., a temperature in the range of 50 to 200° F., and a space velocity in the range of 100 to 1000 v./v./hr., so as to convert said CO to $CO_2$ and produce a CO-free feed; contacting the purified feed from said second contacting step with a nickel oxide catalyst under conditions which effect the polymerization of said olefin to normally liquid polymer, said catalyst having been activated at a temperature in the range of 700 to 1300° F.; and recovering liquid polymer from the process.

7. The process of claim 6 in which the effluent from the polymerization step is fractionated so as to recover a $C_5$ and a heavier cut as the product of the process and a $C_4$ cut and in which the $C_4$ cut is recycled to the polymerization step so as to increase the length of the contacting in this step before regeneration of the nickel oxide catalyst is required.

8. The process of claim 6 in which the effluent from the polymerization step is separated into a $C_4$—$C_5$ cut and a $C_6$ and heavier cut as the product of the process, and the $C_4$—$C_5$ cut is recycled to the polymerization step so as to increase the life of the catalyst.

9. The process of claim 6 in which the nickel oxide is deposited in minor amount on a silica-alumina carrier.

10. The process of claim 6 in which the feed contains at least 15 mol percent ethylene.

11. A process for polymerizing ethylene in a feed containing impurities acetylene and carbon monoxide, each in minor amounts up to 0.3 mol percent of the feed, and hydrogen in molar excess of the acetylene, which comprises contacting said feed with a reduced copper oxide catalyst at a pressure in the range of 100 to 1000 p. s. i. g., a temperature in the range of 100 to 500° F., and a space velocity in the range of 100 to 2400 v./v./hr. so as to selectively hydrogenate and polymerize the acetylene in said feed while maintaining the olefin content of the effluent within 1 mol percent of that of the feed; thereafter, contacting the acetylene-free effluent with dehydrated hopcalite in the absence of free $O_2$ at a pressure in the range of 100 to 750 p. s. i. g., a temperature in the range of 50 to 200° F., and a space velocity in the range of 100 to 1000 v./v./hr., so as to convert said CO to $CO_2$ and free the feed of CO; thereafter, contacting the purified feed under polymerizing conditions including a temperature in the range of 30 to 225° F., with a catalyst consisting essentially of a minor proportion of nickel oxide distended on a major proportion of silica-alumina activated in an oxidizing ambient at a temperature in the range of 700 to 1300° F., so as to form normally liquid $C_4$ and heavier polymer; recycling to the polymerization step a $C_4$ to $C_5$ liquid cut from the polymerization effluent so as to wash said nickel oxide catalyst and prolong its activity; and recovering normally liquid hydrocarbon polymer from the polymerization step.

12. The process of claim 11 in which the recycle stream consists essentially of $C_4$ hydrocarbons and the recovered polymer consists essentially of $C_5$ and heavier liquid polymer.

13. A process for polymerizing an ethylene-rich hydrocarbon feed in contact with a nickel oxide catalyst, said feed containing up to 1 mol percent acetylene which poisons and completely deactivates said catalyst in a period of less than 3 hours, which comprises contacting said feed in the presence of a molar excess of hydrogen in relation to said acetylene with a catalyst consisting essentially of copper obtained by reducing copper oxide under selective hydrogenating conditions for said acetylene including a pressure in the range of 100 to 1000 p. s. i. g., at a temperature in the range of 100 to 500° F., and a space velocity in the range of 100 to 2400 v./v./hr. so as to completely remove said acetylene from said feed while maintaining the ethylene content of the effluent within 1 mol percent of that of the feed; and contacting the acetylene-free effluent with a nickel oxide catalyst under ethylene polymerizing conditions so as to form $C_4$ and heavier normally liquid polymer.

14. A process for polymerizing an ethylene-rich hydrocarbon feed effected in contact with a nickel oxide catalyst, said feed containing up to 1 mol percent CO which poisons and completely deactivates said catalyst in a period of less than 3 hours, which comprises contacting said feed with dehydrated hopcalite in the absence of free $O_2$ at a pressure in the range of 100 to 750 p. s. i. g., a temperature in the range of 50 to 200° F., and a space velocity in the range of 100 to 1000 v./v./hr. so as to convert said CO to $CO_2$ and produce a CO-free feed; and contacting the CO-free feed with a nickel oxide catalyst under ethylene polymerizing conditions so as to form $C_4$ and heavier normally liquid polymer.

15. The process of claim 11 in which the feed also contains a small amount of butadiene up to 0.6 mol percent, including the step of reducing the butadiene content to a maximum of 0.15 mol percent by hydrogenation over the reduced copper oxide catalyst simultaneously with the ethylene hydrogenation.

16. The process of claim 1 in which the feed contains a minor amount of butadiene, including the steps of recovering a $C_4$ cut from the liquid polymer product and recycling a portion thereof to the polymerization step so as to extend the like of the catalyst.

17. The process of claim 3 in which the copper catalyst consists essentially of reduced copper.

18. The process of claim 6 in which the copper catalyst consists essentially of reduced copper.

19. A process for removing from an olefin-rich hydrocarbon feed stream certain catalyst poisons comprising acetylene and carbon monoxide, which comprises first contacting said feed stream with a copper catalyst made by reducing copper oxide, under hydrogenating conditions which selectively hydrogenate acetylene so as to substantially free said feed of acetylene; and then contacting the effluent from the first contacting step with hopcalite under conditions which convert the CO in said effluent to $CO_2$.

20. The process of claim 19 including the steps of contacting the purified feed with a solid polymerization catalyst under polymerizing conditions so as to produce polymer; and recovering polymer from the process.

21. The process of claim 20 wherein said catalyst comprises chromium oxide deposited on at least one member of the group consisting of silica and alumina.

22. The process of claim 20 wherein said catalyst consists essentially of chromium oxide deposited on silica-alumina.

23. A process for polymerizing a normally gaseous olefin in a feed containing impurities comprising principally acetylene and carbon monoxide, each in small amounts up to 1 mol percent of the feed and hydrogen in molar excess in relation to the acetylene present, which comprises contacting said feed at a pressure in the range of 100 to 1000 p. s. i. g., a temperature in the range of 100 to 500° F., and a space velocity in the range of 100 to 2400 v./v./hr. with a copper catalyst made by reducing copper oxide, so as to selectively hydrogenate and polymerize the acetylene in said feed and remove the same as a catalyst poison; thereafter, contacting the acetylene-free effluent from said first contacting step with hopcalite in the absence of free $O_2$ at a pressure in the range of 100 to 750 p. s. i. g., a temperature in the range of 50 to 200° F., and a space velocity in the range of 100 to 1000 v./v./hr., so as to convert said CO to $CO_2$ and produce a CO-free feed; contacting the purified feed from said second contacting step with a polymerization catalyst which is deleteriously affected by said poisons under conditions which effect the polymerization of said olefin; and recovering liquid polymer from the process.

24. The process of claim 23 wherein said catalyst consists essentially of chromium oxide and silica-alumina.

25. A process for polymerizing an olefin-rich hydrocarbon feed in contact with a solid polymerization catalyst, said feed containing up to 1 mol percent acetylene which poisons and deactivates said catalyst in a short period of time, which comprises contacting said feed in the presence of a molar excess of hydrogen in relation to said acetylene with a catalyst consisting essentially of copper, obtained by reducing copper oxide, under selective hydrogenating conditions for said acetylene including a pressure in the range of 100 to 1000 p. s. i. g., a temperature in the range of 100 to 500° F. and a space velocity in the range of 100 to 2400 v./v./hr. so as to remove said acetylene from said feed while maintaining the ethylene content of the effluent within 1 mol percent of that of the feed; and contacting the acetylene-free effluent with said catalyst under polymerizing conditions so as to form polymer.

26. A process for polymerizing an olefin-rich hydrocarbon feed effected in contact with a solid polymerization catalyst, said feed containing up to 1 mol percent CO which poisons and deactivates said catalyst in a short period of time, which comprises contacting said feed with dehydrated hopcalite in the absence of free $O_2$ at a pressure in the range of 100 to 750 p. s. i. g., a temperature in the range of 50 to 200° F., and a space velocity in the range of 100 to 1000 v./v./hr. so as to convert said CO to $CO_2$ and produce a CO-free feed; and contacting the CO-free feed with said catalyst under polymerizing conditions so as to form polymer.

27. The process of claim 19 in which the feed also contains a small amount of butadiene up to 0.6 mol percent, including the step of reducing the butadiene content to a maximum of 0.15 mol percent by hydrogenation over the reduced copper oxide catalyst simultaneously with the acetylene hydrogenation.

28. The process of claim 19 wherein said feed also contains oxygen and same is removed along with the acetylene by contacting with reduced copper oxide.

References Cited in the file of this patent

UNITED STATES PATENTS

| | | |
|---|---|---|
| 1,422,211 | Lamb | July 11, 1922 |
| 1,522,111 | Philipson | Jan. 6, 1925 |
| 2,378,969 | Bailey et al. | June 26, 1945 |
| 2,381,707 | Wood et al. | Aug. 7, 1945 |
| 2,606,940 | Bailey | Aug. 12, 1952 |

OTHER REFERENCES

B. Bruns, Acta Physicochim (USSR), vol. 7, pages 875–82 (1937), Chem. Abst., vol. 32, page 7798.

UNITED STATES PATENT OFFICE
CERTIFICATE OF CORRECTION

Patent No. 2,837,587                                June 3, 1958

John Paul Hogan et al.

It is hereby certified that error appears in the printed specification of the above numbered patent requiring correction and that the said Letters Patent should read as corrected below.

Column 14, line 21, for "ethylene" read -- acetylene --; line 26, for "like" read -- life --; column 2, Table I, second column thereof, under the heading "A", third item, for "0.10" read -- 0.01 --; column 3, line 10, for "ad" read -- and --; same column 3, Table III, first column thereof, second line from the bottom, for "do" read -- 0.2% carbon monoxide --; column 6, line 19, Table V, in the footnote, after "velocity=" insert -- 800 --; column 7, line 54, for "oxygent" read -- oxygen --; column 9, line 13, Table VIII, heading to second column should read -- Psig --.

Signed and sealed this 21st day of October 1958.

(SEAL)

Attest:

KARL H. AXLINE
Attesting Officer

ROBERT C. WATSON
Commissioner of Patents